W. L. PERRY & A. J. MATHEWS.
Fellies.

No. 137,955.          Patented April 15, 1873.

Witnesses:
Fred Haymer
David Aisell

William L. Perry
A. J. Mathews
per Thom & Allen
Attorneys

UNITED STATES PATENT OFFICE.

WILLIAM L. PERRY AND ADONIRAM J. MATHEWS, OF HARTWELL, GA.

IMPROVEMENT IN FELLIES.

Specification forming part of Letters Patent No. 137,955, dated April 15, 1873; application filed November 30, 1872.

*To all whom it may concern:*

Be it known that we, WILLIAM L. PERRY and ADONIRAM J. MATHEWS, of Hartwell, in the county of Hart and State of Georgia, have invented an Improvement in Felly-Joint for Carriage-Wheels, of which the following is a specification:

This invention relates to means for connecting the ends of the felly-sections and the spokes, as also the tire of a wheel for carriages and other wheeled vehicles, by means of a metal socket and bolts, the ends of said socket, which is arranged to form the joint at the end of a spoke, being formed with dovetail recesses to receive dovetail projections on the ends of the felly-sections, whereby strain consequent on contraction and expansion of the felly-sections is removed from the bolts, and a firmer union generally is obtained.

Figure 1:
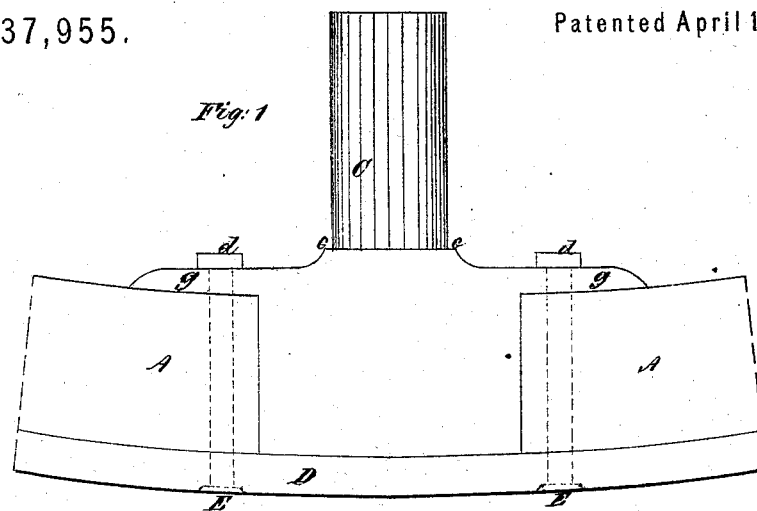
Figure 2:
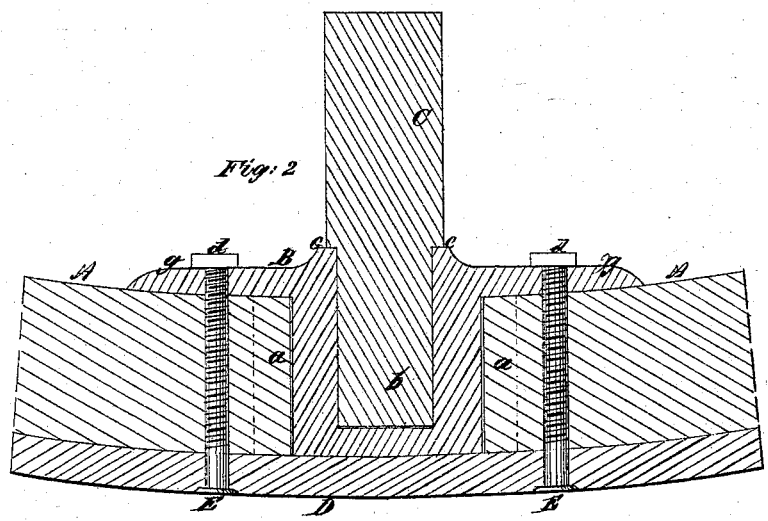
Figure 3:
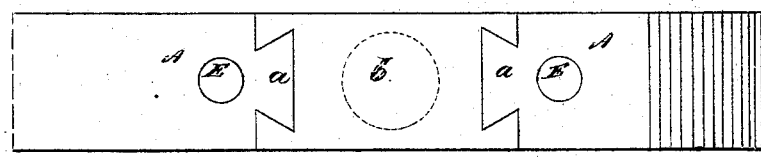

Figure 1 is a side view of a felly-joint made according to my invention. Fig. 2 is a transverse sectional view of the same. Fig. 3 is a face view of the same with the tire removed.

A are two adjoining sections of the felly, formed with a tenon-like or dovetail projections, $a$, upon their adjacent ends. B is a socket made of malleableized cast-iron or other suitable metal, the ends of which are reversed, as more plainly indicated in Fig. 3, to receive the dovetailed projections $a$ of the felly-sections, and which is formed with wings $g$ lapping upon the inner surface of the felly-sections. In the inner side of the socket, midway between its two ends, is a socket-hole, which receives the outer end $b$ of a spoke, C, the latter formed with usual annular shoulder $c$, bearing against the edge of the socket-hole, as represented in Fig. 2.

The parts at each joint of the wheel being singly fitted together in the manner just described, the tire D is applied to the wheel and bolts E are passed through holes appropriately provided, and the nuts $d$ are secured tightly home, thereby binding the whole firmly together.

In a wheel constructed as described, not only is the joint formed at the end of the spoke and prevented from being forced inward or made to "dip," by reason of pressure on the periphery of the wheel being met by the end thrust of the spoke, but the junction of the felly-sections A with the metal socket B by dovetail projections $a\ a$, fitting correspondingly-shaped recesses, relieves the bolts E E of strain consequent upon expansion and contraction of the felly-sections in direction of their length; also, counteracts lateral strain on the end of the spoke, and gives a firmer union generally. As a whole, therefore, the improvement is a valuable one.

What is here claimed, and desired to be secured by Letters Patent, is—

The dovetail projections $a\ a$ on the ends of the felly-sections A, in combination with the metal socket B having dovetail recesses at its ends to receive the projections $a\ a$, the wings $g\ g$, and spoke C, formed with a shoulder, $c$, the tire D, and the bolts E E, the whole being arranged, in relation with each other, as shown and described.

W. L. PERRY.
A. J. MATHEWS.

Witnesses:
F. B. HODGES,
F. C. STEPHENSON.